F. H. KREWSON.
SIGNALING MECHANISM FOR AUTOMOBILES.
APPLICATION FILED SEPT. 20, 1910.
1,001,203.
Patented Aug. 22, 1911.
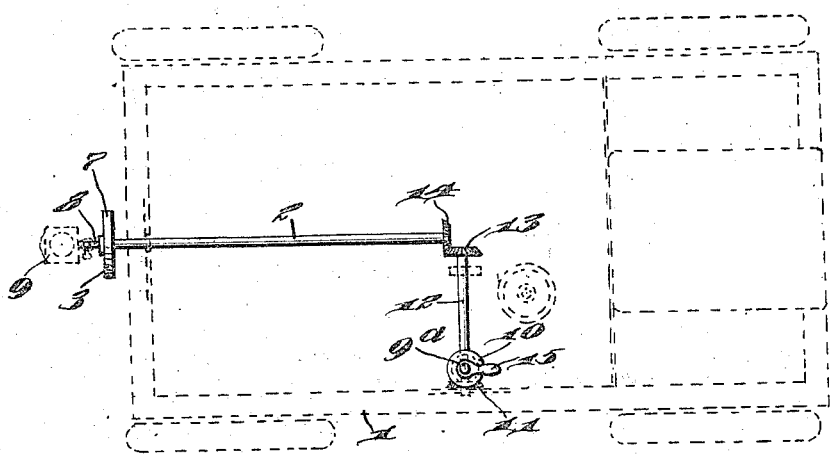
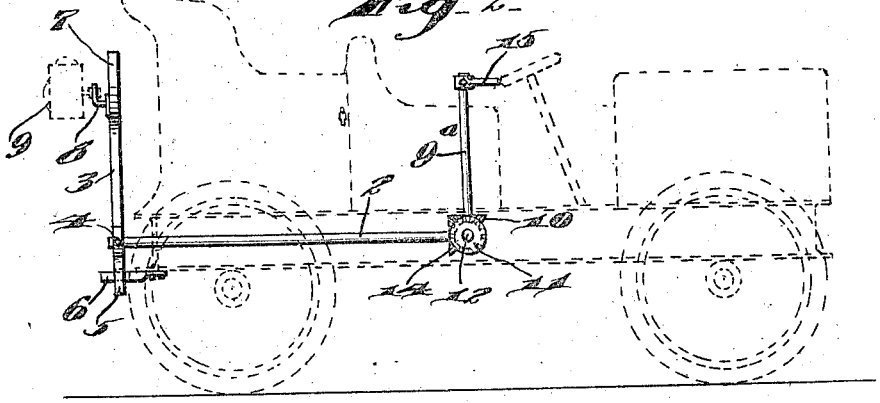
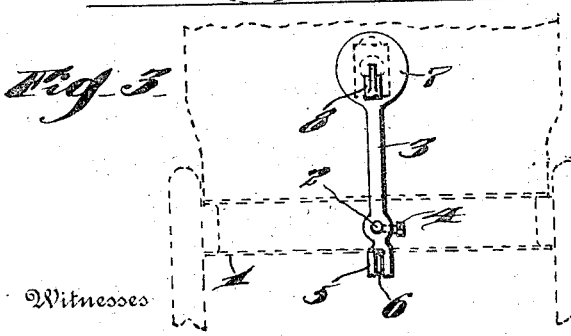

UNITED STATES PATENT OFFICE.

FRANK H. KREWSON, OF PHILADELPHIA, PENNSYLVANIA.

SIGNALING MECHANISM FOR AUTOMOBILES.

1,001,203.  Specification of Letters Patent.  Patented Aug. 22, 1911.

Application filed September 20, 1910. Serial No. 582,829.

*To all whom it may concern:*

Be it known that I, FRANK H. KREWSON, a citizen of the United States, residing at Philadelphia, in the county of Philadelphia and State of Pennsylvania, have invented certain new and useful Improvements in Signaling Mechanism for Automobiles, of which the following is a specification.

My invention relates to improvements in signaling mechanism for automobiles, the object of the invention being to provide a signal at the back of the vehicle which is operative by the chauffeur so as to indicate to the occupants of vehicles following, the direction in which the chauffeur proposes to turn.

A further object is to provide a simple, inexpensive construction of this character which can be used effectually day or night, which can be readily attached to any ordinary automobile, and which will most effectually perform the functions for which it is intended.

With these and other objects in view, the invention consists in certain novel features of construction and combinations and arrangements of parts, as will be more fully hereinafter described and pointed out in the claims.

In the accompanying drawings: Figure 1, is a plan view illustrating my improvements. Fig. 2, is a view in side elevation. Fig. 3, is a rear end view, and Fig. 4, is a detail perspective view of the signal arm.

1, represents the frame of an automobile, and 2 is a longitudinal shaft supported in the frame of the machine, and on this shaft 2 a signal arm 3 is secured, a set screw 4 being shown for the purpose. The arm 3 is secured between its ends on the shaft 2, the shorter end of said arm being bifurcated as illustrated at 5 to receive a spring tongue 6 secured to the frame and adapted to normally hold the signal arm in vertical position, and return it to such position. The free end of the arm 3 is provided with a disk or signal 7, and with a bracket 8 for the attachment of a lamp 9 so that the signal may be readily seen day or night. To operate this signal, a vertically disposed shaft 9ª is provided in convenient reach of the chauffeur, and this shaft is connected by beveled gears 10 and 11, with a transverse shaft 12, the latter connected by beveled gears 13 and 14, with longitudinal shaft 2. A handle 15 is provided on the upper end of shaft 9ª, and when this handle 15 is turned to the right or left, a corresponding motion is given to the signal through the medium of the shafts and gears above explained. For example, if the chauffeur is about to turn to the right, he swings the handle 15 to the right causing the signal arm 3 at the back of the machine to swing to the right, thereby notifying the occupants of the vehicle following of his intentions. When he releases handle 15, spring 6 will return the parts to normal position.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a vehicle frame, of a longitudinal shaft supported on the frame, a signal arm secured on the rear end of said shaft at the back of the frame, a bifurcated lower end on said arm, a flat spring secured to the frame and projected into said bifurcated end, and means for turning the shaft, substantially as described.

2. The combination with a vehicle frame, of a longitudinal shaft supported on the frame, a signal arm secured on the rear end of said shaft at the back of the frame, an enlargement at the outer end of the said signal arm, a lamp bracket secured to the said signal arm at the lower portion of said enlargement, said signal arm bifurcated at its other end, a flat spring secured to the frame projecting into the bifurcated end and adapted to hold the said signal arm in a normal vertical position, a vertical shaft, a handle on said vertical shaft, a transverse shaft, and beveled gears connecting said vertical and longitudinal shafts with said transverse shaft, substantially as described.

In testimony whereof I have signed my name to this specification in the presence of two subscribing witnesses.

FRANK H. KREWSON.

Witnesses:
R. H. KRENKEL,
CHAS. E. POTTS.

Copies of this patent may be obtained for five cents each, by addressing the "Commissioner of Patents, Washington, D. C."